United States Patent [19]

Nemoto

[11] Patent Number: 5,011,225
[45] Date of Patent: Apr. 30, 1991

[54] STRUCTURE OF A MOVABLE HEADREST

[75] Inventor: Akira Nemoto, Akishima, Japan
[73] Assignee: Tachi-S Co. Ltd., Tokyo, Japan
[21] Appl. No.: 495,272
[22] Filed: Mar. 16, 1990
[51] Int. Cl.$^5$ .............................................. A47C 7/36
[52] U.S. Cl. ..................................... 297/408; 297/410
[58] Field of Search ............... 297/408, 410, 403, 396, 297/391

[56] References Cited

U.S. PATENT DOCUMENTS

| | | | |
|---|---|---|---|
| 3,547,486 | 12/1970 | Herzer | 297/408 |
| 3,563,602 | 2/1971 | Ohta | 297/410 |
| 4,545,618 | 10/1985 | Kitamura | 297/410 |
| 4,576,413 | 3/1986 | Hatta | 297/408 |
| 4,606,578 | 8/1986 | Yasui | 297/408 |
| 4,711,494 | 12/1987 | Duvenkamp | 297/408 X |
| 4,765,683 | 8/1988 | Hattori | 297/408 X |
| 4,830,434 | 5/1989 | Ishida et al. | 297/408 |
| 4,844,545 | 6/1989 | Ishii | 297/410 |

FOREIGN PATENT DOCUMENTS

| | | |
|---|---|---|
| 1945571 | 12/1977 | Fed. Rep. of Germany ...... 297/408 |
| 3130780 | 3/1983 | Fed. Rep. of Germany ...... 297/410 |
| 3141515 | 4/1983 | Fed. Rep. of Germany ...... 297/410 |
| 3615857 | 11/1986 | Fed. Rep. of Germany ...... 297/403 |

Primary Examiner—José V. Chen
Attorney, Agent, or Firm—Oldham & Oldham Co.

[57] ABSTRACT

A structure of a movable headrest, where a headrest body is movable between a use position where it is located at a point for supporting the head of an occupant and non-use position where it is lowered from the view field of the occupant, by a headrest drive mechanism, and where the headrest body is removable from a headrest stay holder provided in the seat back. The headrest stay holder includes a locking device having a lock release part.

7 Claims, 4 Drawing Sheets

FIG.1
FIG.2
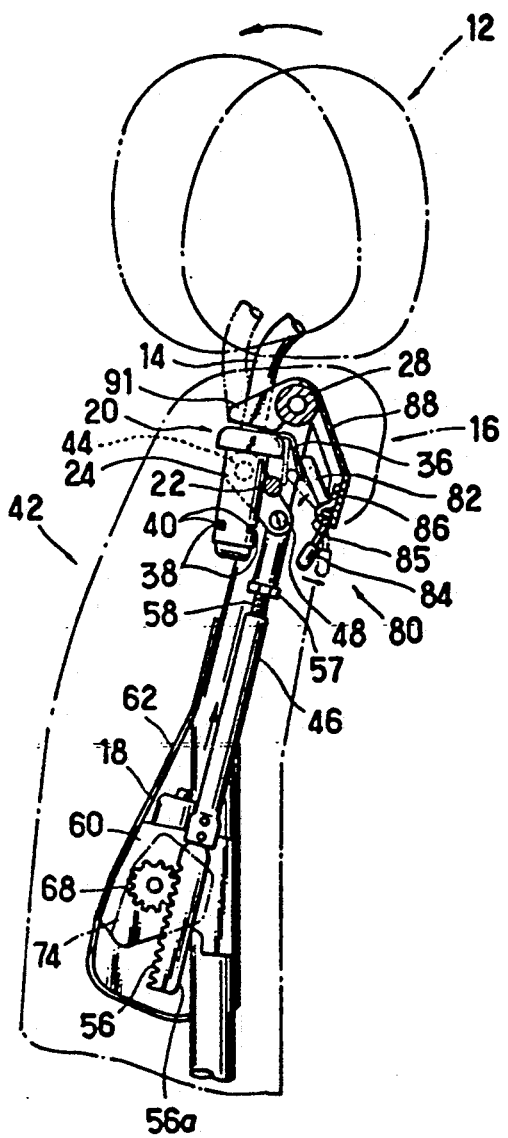
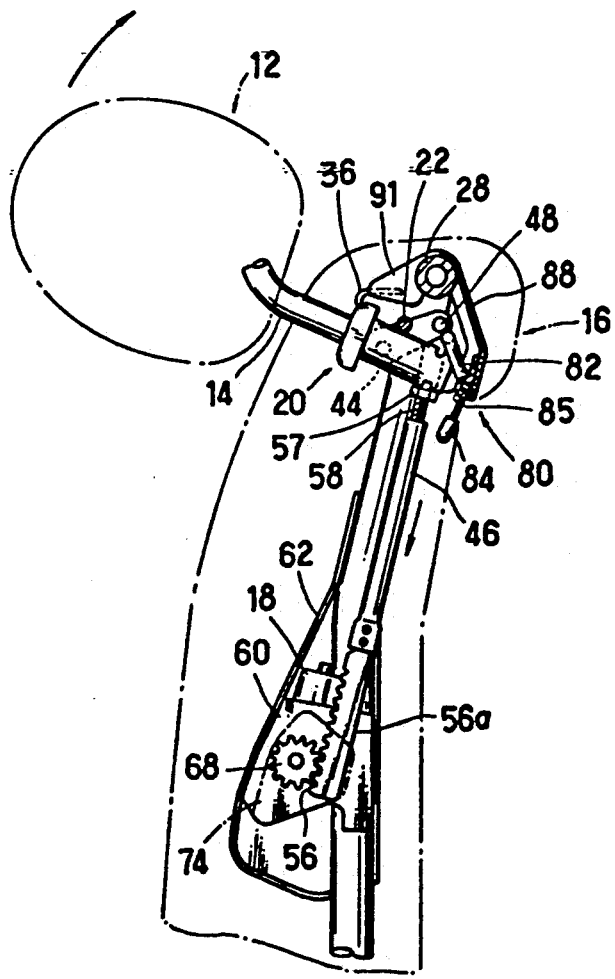

STRUCTURE OF A MOVABLE HEADREST

BACKGROUND OF THE INVENTION

1. Field of the invention

The present invention relates to a movable headrest provided on an automotive seat, which is to be moved between an erecting use position and a forwardly inclined position, to thereby permit a driver on the front seat and a rear-seat occupant to attain a good backward view and front view without hindrance of the headrest.

2. Description of Prior Art

In general, most of the movable headrest is attached via a headrest stay on the top of the seat back of a rear seat or front seat. Typically, the headrest is of a movable type wherein the headrest is movable between an erecting use position where it is located upon the top of the seat back for supporting the head of an occupant, and a forwardly inclined non-use position where it is inclined forwardly of the seat back away from the occupant view field. Such headrest movement is affected by means of a motor and the selection between the two different use and non-use positions is made by a switching operation, so as to control the appearance and disappearance of the headrest upon the seat back, attaining thus a good backward or forward view field in the automobile.

However, this sort of headrest has encountered a difficulty with its ready applicability for use in a full-flat type of seat wherein the seat back can be inclined backwardly to a generally horizontal line in registory with the upper surface of the seat cushion of the rear seat, thus increasing the seating area sufficient for the occupant to lay his or her entire body thereon. That is to say, to permit such full-flat backward inclination of the seat back requires the removal of the headrest from the seat back, and in most cases, such movable-type headrest is fixed to the seat back and not removable therefrom. This is also the case with affixing a pillow boots over the headrest stay for preventing it against exposure to view, or replacing the seat covering member by a new one. At any rate, some circumstances requires the removal of the headrest from the seat back, but most of the movable-type headrests have been difficult to remove from the seat back by an occupant.

SUMMARY OF THE INVENTION

In view of the above-stated drawbacks, it is therefore a first purpose of the present invention to provide an improved structure of a movable headrest which is capable of removal of its headrest body from a seat back and causes movements of the headrest body between a use position where it is located for supportting the head of an occupant and a non-use position where it is lowered below a view field of the occupant.

In accomplishment of such purpose, the present invention is of such structure that a headrest drive mechanism is provided, which includes a motor and causes a before and after movement of a headrest body between the use and non-use positions, and the headrest body is supported by a pair of stays which are each removably secured in respective stay holders fixed on a shaft associated with the headrest drive mechanism. The headrest stay holders are therefore each provided with a locking means having a lock release part, which locks and unlocks the corresponding stays against the holders. The lock release part of such locking means is actuated by a lock actuating mechanism provided in the seat back, so as to cause the locking means to lock or unlock the headrest stays.

Accordingly, by operation of the lock actuating mechanism, the locking means for the headrest stays can easily be released from its locking state, and the headrest body as well as the stays are removable from the seat back. This permits for adapting such movable headrest for use in a full-flat type seat which requires removal of a headrest body therefrom when its seat back is inclined rearwardly to the same level or in registry with a seat cushion of a rear seat.

It is a second purpose of the present invention to prevent removal of the headrest body, when located at the non-use position, from the seat back, thereby avoiding an unintentional or erroneous unlocking operation of the lock actuating mechanism.

To this end, the present invention is further of such locking structure wherein the lock release part of the locking means is accessible and actuaated by the lock actuating mechanism, only when the headrest body is located at a backward limit point upon the top of the seat back. Thus, there is completely eliminated a possibility of the headrest body being dropped down or removed from the forward limit point on the top of the seat back or the non-use position, where a tendency is great for the headrest body to fall down from the seat back.

BRIEF DESCRIPTION OF THE DRAWINGS

FIG. 1 is a schematic, longitudinally sectional view of a movable headrest structure in accordance with the present invention, showing the backward limit point of a headrest body;

FIG. 2 is a schematic, longitudinally sectional view of the same structure, showing the non-use position of the headrest body;

DETAILED DESCRIPTION OF PREFERRED EMBODIMENTS OF THE INVENTION

Figure 3:
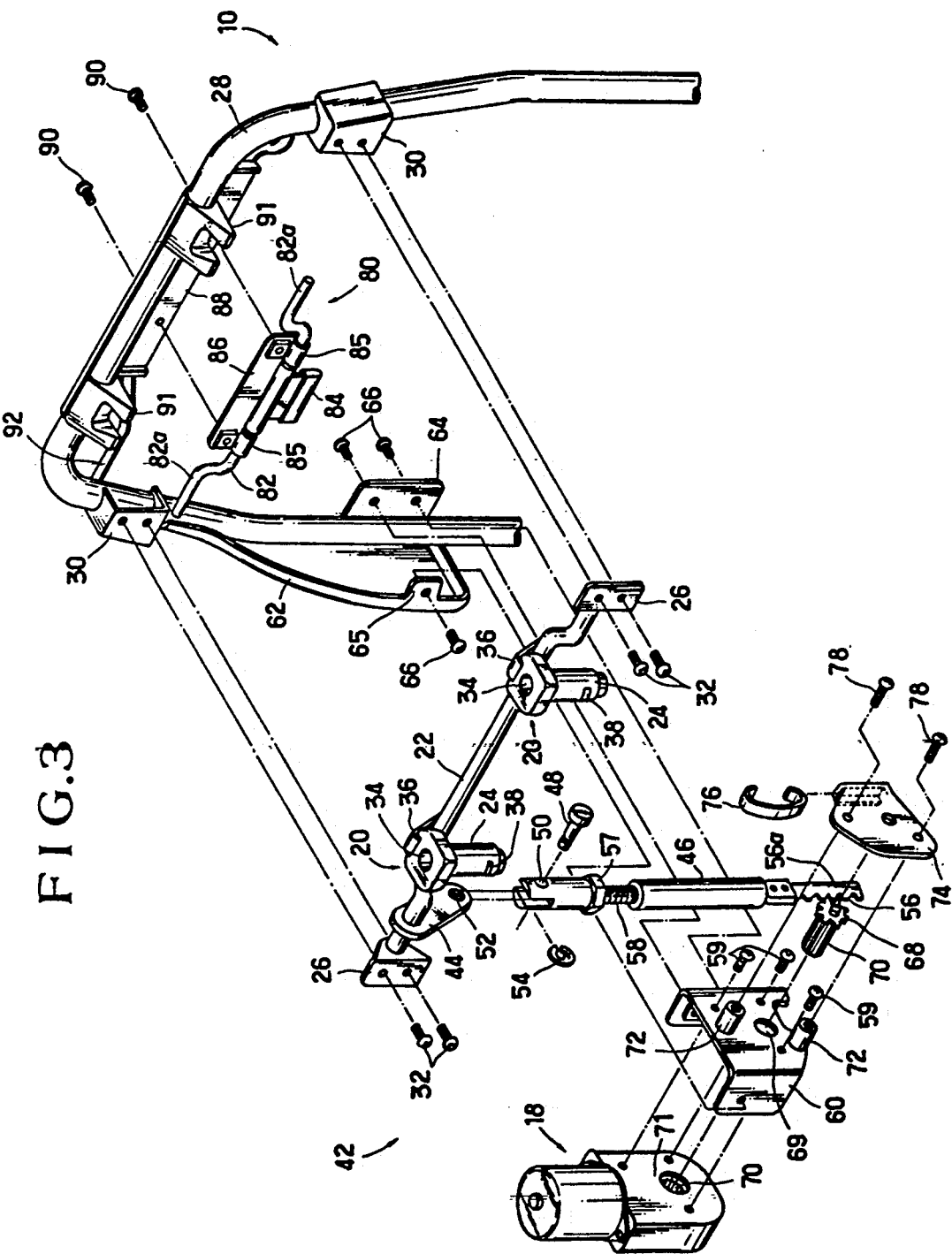
FIG. 3 is a partially broken, exploded, perspective view of the structure.

Referring to FIG. 3, there is shown a headrest drive mechanism (10) for moving a headrest (12) forwardly an backwardly relative to a seat back (16) in order to cause displacements of the headrest body (12) between an erecting use position as shown in FIG. 1 and a forwardly inclined non-use position as shown in FIG. 2. In such non-use position, the headrest body (12) is lowered below the sight view line of an occupant who wishes to look over the seat back (16), so that his or her view field is widened.

Such displacements of the headrest body (12) are effected by the drive of a motor (18), which is preferably a DC geared motor.

As seen from FIGS. 1, 2 and 3, the headrest (12) is provided with a pair of spaced-apart headrest stays (14), an those two stays (14) are received in a pair of spaced-apart headrest stay holders (20) respectively. The two stay holders (20) are supported in a pair of cylindrical brackets (24), respectively, the brackets (24) being fixed to a shaft (22) which is rotatably journalled to and between a pair of spaced-apart support brackets (26). The support brackets (26) are fixed to the shaft (22). The support brackets (26) are respectively, fixedly mounted by securing screws (32) to a pair of mounting brackets (30) fixed to a seat back frame (28). Thus the shaft (22) is free to rotate with respect to the seat hack frame (28).

Figure 4:
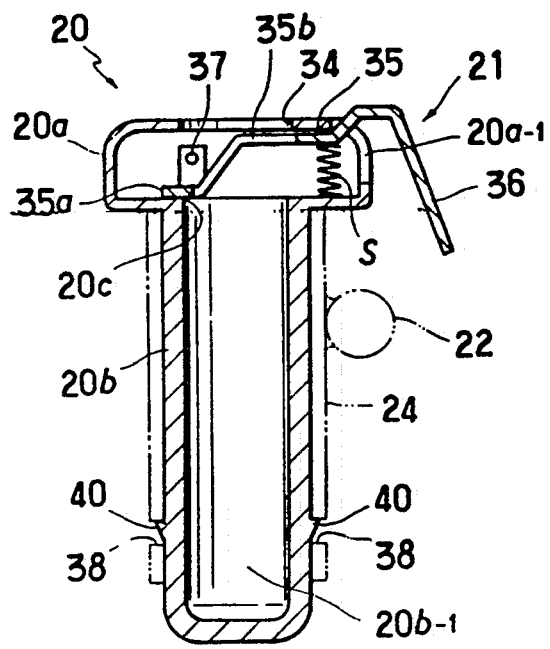
FIG. 4(A) is a longitudinally sectional view of a headrest stay holder.
FIG. 4(B) is a partially broken, sectional view of the headrest stay holder, showing the state wherein a headrest stay is locked in the holder.
FIG. 4(C) is a partially broken, sectional view of that holder, showing the state wherein the headrest is unlocked in the holder.
Figure 4:
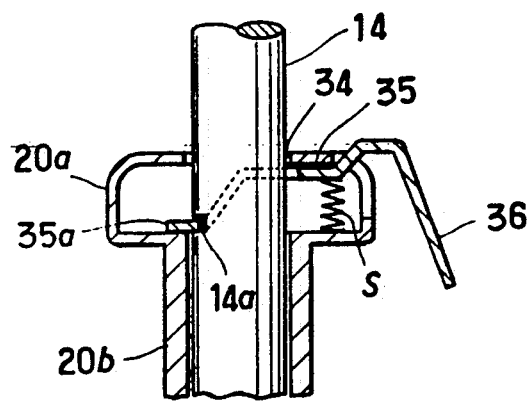
Figure 4:
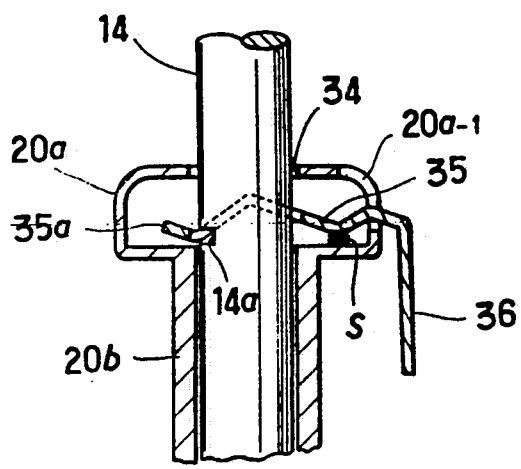

As best shown in FIGS. 4(A), 4(B) and 4(C), the headrest stay holder (20) comprises a head portion (20a) and a cylindrical body portion (20b), the head portion being of a circular shape having a greater diameter relative to that of the cylindrical body portion (20b). The head portion (20a) is formed with a hole (34) through which the headrest stay (14) passes, whereas the body portion (24b) is formed with a bore (20b-1) which receives supportively the headrest stay (14). Within the head portion (20a), is provided a locking device (21) which consists essentially of a lock plate (35), a pivot (37) defined at the forward part of the lock plate (35) so as to allow free rotation of the lock Plate (35) about the pivot (37), and a spring (S) disposed between the lower flange part of the head portion (20a) and lock pawl (35a) so as to bias the lock pawl (35a) of the lock plate (35a) towards that lower flange part of the head portion (30a), thereby normally urging the lock pawl (35a) to rest at the neck (20c), projecting its part to the bore (20b-1) of the cylindrical body portion (20b). As can be seen from FIG. 4(A), a pair of protrudent parts (40) are integrally formed on the lower part of the cylindrical body portion (20b), and are respectively secured in a pair of apertures (38) formed in the lower part of the cylindrical bracket (24) (see also FIG. 3), whereby the holder (20) is secured in the bracket (24) against removal therefrom and fast upon the shaft (22). The lock plate (35) is formed with a hole (35b) through which the headrest stay (14) passes and is further formed integrally with a lock release lever (36).

Accordingly, as understandable from FIG. 4(B) and 4(C), the headrest stay (14) is locked against removal from the holder (20) when the locking drive (21) is in a locked state as in FIG. 4(B), with its lock pawl (35a) being kept engaged by the biasing force of the spring (S) into the recessed lock groove (14a) of the stay (14), and if the lock release lever (36) is pushed downwardly as in FIG. 4(C), overcoming the biasing force of the spring (S), then the lock plate (35) is rotated about the pivot (37) clockwise, so that the lock pawl (35a) thereof is disengaged from the groove (14a), to thereby allow the headrest stay (14) to be removed from the holder (20) at any time.

Description will now be made of a headrest drive mechanism (42), with reference to FIG. 1, 2 and 3. The above-described headrest body (12) is moved between the use and non-use positions by means of this drive mechanism (42).

According to the headrest drive mechanism (42), the headrest body (12) is subject to such before and after movements of the headrest body (12) between the use and non-use positions, by a link arm (44) and a connecting rod (46).

The link arm (44) is at its upper end and is fixed to the shaft (22). The lower end of the arm (44) is formed with a hole (52), and is connected, rotatably, pivotally, to the upper end part of the connecting rod (46) by means of a pivot pin (48) and E-ring (54), such that the pin (48) passes through the hole (50) of the rod (46) and hole (52) of the arm (44), to be secured by the E-ring (54). The connecting rod (46) extends vertically relative to the horizontally extended shaft (22), and terminates, at is lower end part, in a rack gear area (56). The intermediate part of the connecting rod (46) is provided with an adjusting screw area (58) which is threadedly engaged with an adjusting nut (57) provided at the upper half region of the connecting rod (46), so that the entire length of the rod (46) may be adjustably shortened or lengthened y rotating the adjusting nut (57), which permits for absorbing some differences in the frame construction of different seats and thus makes possible a precise imparting of a drive force to the link arm (44) through this connecting rod (46).

The motor (18) is, as shown in FIG. 3, mounted fast upon a support bracket (60) by means of securing screws (59). The support bracket (60) is fixed to the lug (65) projected integrally from a side frame (62) of the seat back frame (28) by means of securing screws (66). As shown, the motor (18) is equipped with a bearing member (71) having a spline coupler (70) formed therein. A pinion gear (68) is connected to the motor (18) via the coupler (70), and meshed with the rack gear area (56) of the connecting rod (46).

A guide plate (74) is firmly mounted to the support bracket (60) via two spacer members (72) by means of securing screws (59), such that the rack gear area (56) of the connecting rod (46) is slidably supported by the guide plate (74). A plate spring (76) is provided at the guide plate (74) and adapted to be abutted against the rear side (56a) of the guide plate (74), to thereby bias the rack gear (56) into mesh engagement with the pinion gear (68).

With the above-described structure, it is seen that, when the motor (12) is driven, the pinion gear (68) is rotated, which in turn causes simultaneous vertical movement of the connecting rod (46) via the rack gear (56), and the link arm (440 is caused to move vertically, which rotates the shaft (22), with the result that the headrest stay holders (20) are rotated with respect to the central axis of the shaft (22), and thus the headrest body (12) is displaced between the use position as shown in FIG. 1 and non-use position as shown in FIG. 2.

At the seat back frame (28), there is provided a lock actuating mechanism (80) for selectively locking and unlocking the locking device (21) associated with the headrest stay holder (20). The lock actuating mechanism (80) comprises an actuator lever (82) having a pair of contact lever sections (82a) which are respectively disposed at points corresponding to the foregoing lock release lever (36) each of the two headrest stay holders (82), an operation lever (84) fixed integrally with the intermediate part of the actuator lever (82), the operation lever (84) being rotatably supported by a pair of semicircular brackets (85), and a mounting plate (86) on which the brackets (85) are fixed by means of securing screws (90), the mounting plate (86) being fixed to a support plate (88) dependent from the upper frame section of the seat back frame (28). Accordingly, it is seen that forward and backward rotation of the operation lever (84) causes simultaneous rotation of the actuator lever (85), which in turn causes rotative displacement of the two contact lever sections (82a) into pressing contact with the lock release lever (36), or away from the same. The pressing of the contact lever sections (82a), as stated above, results in the lock pawl (35a) of the lock plate (35) being disengaged from the recessed lock groove (14a) of the headrest stay (14), whereupon the stay (14) is placed in an unlocked state, allowing removal of the headrest body (12), while on the other hand, the non-pressing of the contact lever sections (82a) leaves the lock pawl (35a) in engagement with the recessed lock groove (14a) of the headrest stay (14), to thereby lock the headrest body (12) against removal.

Now, referring to FIG. 1, assuming that the operating lever (84) is drawn upwardly from the rear side of the seat back (16) when the headrest body (12) is located at a modest backwardly inclined position as indicated by the one-dot chain line, then the operation lever (84) per se is rotated about the point (85) in the counterclockwise direction, and simultaneously, the two contact lever sections (82a) are brought to a pressing contact with the two lock release levers (36), respectively, at one time, whereby both lock pawls (35a) of the lock plate (83) are disengaged from the lock grooves (14a) of the headrest stays (14), permitting removal of the headrest stays (14) from the respective holders (20). Thus, the headrest body (12) can be removed from the seat back (16). In that way, by manipulating the operation lever (84), the locking devices (21) of the holders (20) are placed in a lock released state against the respective two headrest stays (14), so that the two stays may be removed together with the headrest body (12) from the seat back (16). Therefore, the above-stated headrest structure is well adaptable for use in such full-flat type of seat which requires removal of headrest therefrom. Further, since the removal of the headrest body (12) is easily affected by simply manipulating the operation lever ((84), it is readily possible for an ordinary person to affix a pillow cover, seat cover and the like over the seat, or replace them by a new one.

Designations (91) denote a pair of stay guide members fixed on the upper frame section of the seat back frame (28). The guide members (91) are adapted for guiding the insert or removal of the stays (14) into or from the respective holders (20).

Designation (92) denotes a support rod for reinforcing the mounting plate (88).

Referring to FIGS. 1 and 2, it should be noted that the lock actuating mechanism (20) is only put into a lock operation against the locking device (21) when the headrest body (12) is located generally at a backward limit point as indicated by the one-dot chain line in FIG. 1. For, in that case, the lock release lever (36) is brought close to the point where It is surely to be contacted by the contact lever section (82a) of the lock actuating mechanism (80). On the other hand, when the headrest body (12) is displaced to the non-use position as shown in FIG. 2, the headrest stay holder (20) is rotated forwardly, with the lock release lever (36) being displaced away from the contact lever section (82a), whereupon the lock actuating mechanism (80) is placed in an inoperative state against the locking device (21), preventing an unlocking access to the headrest stay holder (20). It is therefore to be understood that the headrest body (12), when located at such non-use position where it is easily dropped with its own weight, is safely prevented against removal from the seat back (16), even if the operation lever (84) is contacted by a rear-seat occupant, and thus an occupant on this particular front seat is positively protected from this kind of accident.

Figure 5:
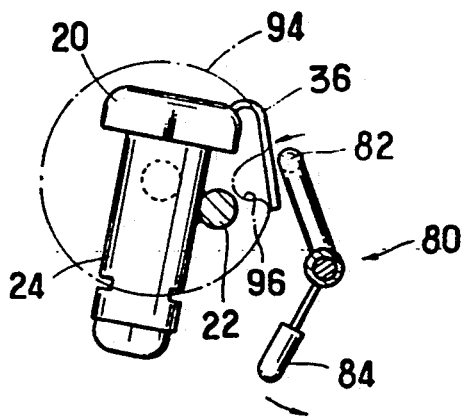
FIGS. 5(A) and 5(B) are respectively partially enlarged end elevations of another embodiment.
Figure 5:
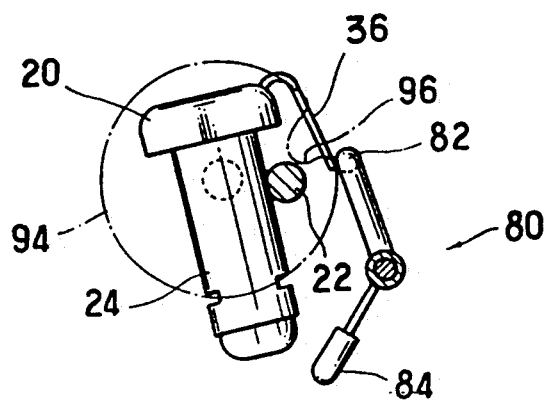

FIGS. 5(A) and 5(B) show another embodiment of the mechanism which is directed to allowing the above-discussed headrest unlocking operation, only when the headrest body (12) is exactly located at the backward limit point as indicated by the one-dot chain line in FIG. 1. For that purpose, in the present embodiment, a lock disc (94) having a notch (96) is provided on the headrest stay holder (20) such that the lock disc (94) is to be rotated with the rotation of the holder (20). The notch (96) should be so arranged in the disc (94) that it is to be brought to the point corresponding to the contact lever section (82a) associated with the lock actuating mechanism (80), when the headrest body (12) or the headrest stay holder (20) is exactly located at the backward limit point. With this arrangement, just when the headrest body (12) is, located at that backward limit point, the contact lever section (82a) is allowed to be pressed against the lock release lever (36), by the reason that the notch (96) provides a passage which allows the contact lever section (82a) to move therealong to reach and push the lock release lever (36), so that, only in such case, the operation lever (84) can be operated for the unlocking purpose. But, as shown in FIG. 5(B), if the headrest body (12) is inclined a little forwardly from the backward limit point, the notch (96) is displaced from the foregoing point corresponding to the contact lever section (82a), resulting thus in bringing the normal circumferential edge of the disc (94) in front of the lever section (82a), whereby the operation lever (84) is not rotated due to its being contacted with the circumferential edge of the disc (94), except for the notch (96). Accordingly, the lock releasing point is limited to such notch (96). In other words, since the unlocking of the headrest stays (14) is effected only when the headrest body (12) is located at the backward limit point thus, as stated earlier, resting on the seat back (16), an unintentional or erroneous operation of the lock actuation mechanism (80) for releasing the locked state of the headrest stay holders (20) will never result in the headrest body (12) being removed or dropped down from the seat back (16).

Figure 6:
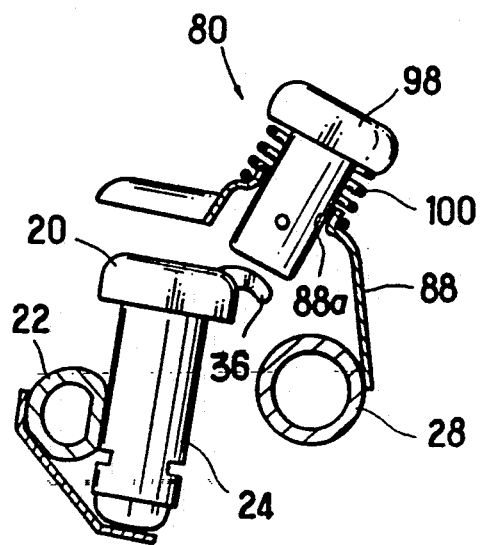
FIG. 6 is a partially broken side view of another embodiment of a lock actuating mechanism.

FIG. 6 shows another embodiment of the lock actuating mechanism (80), according to which a self-returnable push button (98) is slidably fitted in the hole (88a) perforated in the support plate (88) and disposed adjacent to the lock release lever (36), such that depressing the push button (98) displaces its lower end downwardly, which presses the lock release lever (36), to thereby disengage the lock pawl (35a) of the associated lock plate (35) from the lock groove (14a) of the headrest stay (14). The push button (98) is provided with a return spring (100), so that the button (98) is returnable by the resilient expanding force of the spring (100) from the depressed point to the shown initial released point. The lock release lever (36), in this embodiment, is formed in a simple shape sufficient to be contacted and pressed by the the lower end of the push button (98). With this structure, the locking and unlocking of the headrest body (12) can be more easily be affected through the pushing operation.

While having described above, it should be understood that the present invention is not limited to the illustrated embodiments, but any other modifications, replacements, and additions may structurally be possible without departing from the spirit and scope of the appended claims. For example, the motor (12) may be directly connected to the shaft (22) without use of the pinion and rack gear mechanism (68, 56).

What is claimed is:

1. A structure of a movable headrest, in which said headrest is connected upon a seat back of a seat and movable between a use position where it sits on top of the seat back for supporting the head of an occupant sitting on the seat and a non-use position where said headrest is located, permitting said occupant to attain a good field view without hindrance of said headrest, said structure comprising:

a removable headrest body having a pair of headrest stays which are attached atop said seat back;

a shaft which is rotatably supported between a pair of spaced-apart support brackets in an upper area of said seat back;

a headrest stay holder in which each of said pair of headrest stays is received, each of said headrest stay holders being fixed to said shaft, and including a locking means for locking and unlocking said headrest stays, said locking means having a lock release means for placing said locking means in an unlocked state, to thereby release a locked state of said headrest stays against said holder;

a lock actuating means for selectively locking and unlocking said release means associated with said headrest stay holder; and a headrest drive mechanism for causing rotational movement of said headrest body between said use position and non-use position, said mechanism being operatively connected with a drive means so as to impart a drive force to said shaft, thereby causing seat headrest body to rotate; and a means for allowing removal of said headrest stays that allow removal of said headrest body from said top of said seat back, whereby said headrest body is moved between said use and non-use positions through said headrest drive mechanism, and said headrest body is removable from said top of said seat back by operation of said means for actuating said lock release means associated with said headrest stay holder.

2. The structure as defined in claim 1, wherein said headrest drive mechanism comprises:

a link arm fixed to said shaft, said link arm extending in a direction orthogonally intersecting a axis of said shaft;

a connecting rod, an upper end of which is pivotally connected to a free end of said link arm, and a lower end part of which is provided with a rack gear; and a pinion gear provided at said drive means, said pinion gear being meshed with said rack gear of said connecting rod, whereby a rotation of said pinion gear, which is caused by said drive means, causes vertical movement of said connecting rod, which in turn causes swinging movement and thus rotation of said shaft, to thereby cause said headrest body to rotate forward and backwardly relative to said seat back.

3. The structure as defined in claim 1, wherein said drive means comprises a motor.

4. The structure as defined in claim 1, wherein said locking mechanism comprises lock plate that is movable between a lock point where it locks said headrest stay in said headrest stay holder and an unlock point where it unlocks said headrest stay from said holder, wherein said lock release means comprises a projecting plate which is integrally formed with said lock plate, and wherein said lock actuating means comprises a lever which is operable to push said projecting plate to thereby cause said locking mechanism to unlock said headrest stay.

5. The structure as defined in claim 1, wherein said means for allowing removal of said headrest body restrictively from said top of said seat back, is so arranged that, only when said headrest body is located generally at a backward limit point upon said seat back, said means allows said lock actuating means to actuate said lock release means of said locking mechanism so as to cause unlocking of said headrest stays from said headrest stay holder, whereby said headrest body is removable only from said backward limit point at said toP of said seat back.

6. The structure as defined in claim 5, wherein said means comprises a disc which is provided integrally on said headrest stay holder, said disc having a notch formed at its circumferential edge and being so arranged that, when said headrest body is located at said backward limit point, said disc orients its notch towards said lock actuating means, to thereby permit an access of said lock actuating means, through said notch, to said lock release means of said locking mechanism, whereby operation of said lock actuating means actuates said lock release means to cause said locking mechanism to unlock said headrest stays from said headrest stay holder, and when said headrest body is moved from said backward limit point, said disc is rotated with rotation of said headrest stay holder, with said notch being oriented away from said locking actuating means, whereby said circumferential edge of said disc faces said locking actuatting means, to thereby prevent said access of said locking actuating means and thus unlocking of said locking mechanism.

7. The structure as defined in claim 1, wherein said lock actuating means comprises a push button which is operable to actuate said lock release means to unlock said locking mechanism to release said locked state of said headrest stays against said headrest stay holder.

* * * * *